United States Patent
Jacobvitz et al.

(10) Patent No.: US 12,449,986 B2
(45) Date of Patent: Oct. 21, 2025

(54) OPTIMIZED HANDLING OF HIGH CURRENT CONSUMPTION DURING AN OPEN BLOCK READ

(71) Applicant: SANDISK TECHNOLOGIES, INC., Milpitas, CA (US)

(72) Inventors: Adam Jacobvitz, Mountain View, CA (US); Piyush Dhotre, San Jose, CA (US); Niles Yang, Mountain View, CA (US); Brandon Jensen, San Jose, CA (US)

(73) Assignee: SANDISK TECHNOLOGIES, INC., Milpitas, CA (US)

( * ) Notice: Subject to any disclaimer, the term of this patent is extended or adjusted under 35 U.S.C. 154(b) by 16 days.

(21) Appl. No.: 18/533,508

(22) Filed: Dec. 8, 2023

(65) Prior Publication Data
US 2025/0190124 A1   Jun. 12, 2025

(51) Int. Cl.
*G06F 3/06* (2006.01)

(52) U.S. Cl.
CPC ............ *G06F 3/0625* (2013.01); *G06F 3/064* (2013.01); *G06F 3/0652* (2013.01); *G06F 3/0679* (2013.01)

(58) Field of Classification Search
CPC ...... G06F 3/0625; G06F 3/064; G06F 3/0652; G06F 3/0679
See application file for complete search history.

(56) References Cited

U.S. PATENT DOCUMENTS

| | | | |
|---|---|---|---|
| 10,902,925 B1 | 1/2021 | Lien | |
| 11,189,337 B1 | 11/2021 | Lien | |
| 2020/0019497 A1* | 1/2020 | Na | G06F 3/064 |
| 2020/0209944 A1* | 7/2020 | Palmer | G06F 9/3836 |
| 2021/0181941 A1 | 6/2021 | Bernat | |
| 2022/0206915 A1* | 6/2022 | Li | G06F 3/064 |
| 2022/0229592 A1* | 7/2022 | Li | G06F 3/0659 |
| 2023/0126422 A1* | 4/2023 | Agrawal | G11C 16/08 365/233.1 |
| 2024/0219993 A1* | 7/2024 | Kim | G01R 21/133 |

FOREIGN PATENT DOCUMENTS

CN     115857811 A     3/2023

* cited by examiner

*Primary Examiner* — Curtis James Kortman
(74) *Attorney, Agent, or Firm* — Arlene Neal; Neal Blibo (57) ABSTRACT

A storage device manages the effects of read operations on the power consumption on the storage device. A controller on the storage device determines the openness of blocks on a memory device. The controller may execute a first protocol and/or a second protocol. In executing the first protocol, the controller may fill open blocks on the memory device such that subsequent read operations are performed on blocks that have been filled. In executing the second protocol, the controller may control which read operations are sent to the memory device based on real-time power consumption on the storage device.

18 Claims, 7 Drawing Sheets

| PROFILE | OPERATIONAL CURRENT - ICC(mA) | NAND VCC/EFFICIENCY | TOKENS |
|---|---|---|---|
| SLC SENSE AVG 0% OPEN BLOCK | 61 | (2.5V / 95%) | 161 |
| SLC SENSE PEAK 0% OPEN BLOCK | 82 | (2.5V / 95%) | 216 |
| TLC SENSE AVG 0% OPEN BLOCK | 72 | (2.5V / 95%) | 189 |
| TLC SENSE PEAK 0% OPEN BLOCK | 160 | (2.5V / 95%) | 421 |
| SLC SENSE AVG 25% OPEN BLOCK | 72.4 | (2.5V / 95%) | 191 |
| SLC SENSE PEAK 25% OPEN BLOCK | 95.6 | (2.5V / 95%) | 252 |
| TLC SENSE AVG 25% OPEN BLOCK | 75 | (2.5V / 95%) | 197 |
| TLC SENSE PEAK 25% OPEN BLOCK | 175 | (2.5V / 95%) | 461 |
| SLC SENSE AVG 50% OPEN BLOCK | 88.5 | (2.5V / 95%) | 253 |
| SLC SENSE PEAK 50% OPEN BLOCK | 107 | (2.5V / 95%) | 282 |
| TLC SENSE AVG 50% OPEN BLOCK | 90 | (2.5V / 95%) | 237 |
| TLC SENSE PEAK 50% OPEN BLOCK | 175 | (2.5V / 95%) | 461 |
| SLC SENSE AVG 75% OPEN BLOCK | 99.2 | (2.5V / 95%) | 261 |
| SLC SENSE PEAK 75% OPEN BLOCK | 121 | (2.5V / 95%) | 318 |
| TLC SENSE AVG 75% OPEN BLOCK | 99 | (2.5V / 95%) | 261 |
| TLC SENSE PEAK 75% OPEN BLOCK | 206 | (2.5V / 95%) | 542 |
| SLC SENSE AVG 99% OPEN BLOCK | 107.5 | (2.5V / 95%) | 283 |
| SLC SENSE PEAK 99% OPEN BLOCK | 145.4 | (2.5V / 95%) | 383 |
| TLC SENSE AVG 99% OPEN BLOCK | 114 | (2.5V / 95%) | 300 |
| TLC SENSE PEAK 99% OPEN BLOCK | 255 | (2.5V / 95%) | 671 |

FIG. 1

| PROFILE | OPERATIONAL CURRENT - ICC(mA) | NAND VCC/EFFICIENCY | TOKENS |
|---|---|---|---|
| SLC SENSE AVG 0% OPEN BLOCK | 61 | (2.5V / 95%) | 161 |
| SLC SENSE PEAK 0% OPEN BLOCK | 82 | (2.5V / 95%) | 216 |
| TLC SENSE AVG 0% OPEN BLOCK | 72 | (2.5V / 95%) | 189 |
| TLC SENSE PEAK 0% OPEN BLOCK | 160 | (2.5V / 95%) | 421 |
| SLC SENSE AVG 25% OPEN BLOCK | 72.4 | (2.5V / 95%) | 191 |
| SLC SENSE PEAK 25% OPEN BLOCK | 95.6 | (2.5V / 95%) | 252 |
| TLC SENSE AVG 25% OPEN BLOCK | 75 | (2.5V / 95%) | 197 |
| TLC SENSE PEAK 25% OPEN BLOCK | 175 | (2.5V / 95%) | 461 |
| SLC SENSE AVG 50% OPEN BLOCK | 88.5 | (2.5V / 95%) | 253 |
| SLC SENSE PEAK 50% OPEN BLOCK | 107 | (2.5V / 95%) | 282 |
| TLC SENSE AVG 50% OPEN BLOCK | 90 | (2.5V / 95%) | 237 |
| TLC SENSE PEAK 50% OPEN BLOCK | 175 | (2.5V / 95%) | 461 |
| SLC SENSE AVG 75% OPEN BLOCK | 99.2 | (2.5V / 95%) | 261 |
| SLC SENSE PEAK 75% OPEN BLOCK | 121 | (2.5V / 95%) | 318 |
| TLC SENSE AVG 75% OPEN BLOCK | 99 | (2.5V / 95%) | 261 |
| TLC SENSE PEAK 75% OPEN BLOCK | 206 | (2.5V / 95%) | 542 |
| SLC SENSE AVG 99% OPEN BLOCK | 107.5 | (2.5V / 95%) | 283 |
| SLC SENSE PEAK 99% OPEN BLOCK | 145.4 | (2.5V / 95%) | 383 |
| TLC SENSE AVG 99% OPEN BLOCK | 114 | (2.5V / 95%) | 300 |
| TLC SENSE PEAK 99% OPEN BLOCK | 255 | (2.5V / 95%) | 671 |

OPTIMIZED HANDLING OF HIGH CURRENT CONSUMPTION DURING AN OPEN BLOCK READ

BACKGROUND

A storage device may be communicatively coupled to a host and to non-volatile memory including, for example, a NAND flash memory device on which the storage device may store data received from the host. The NAND flash memory may be divided into partitions which may be further divided into blocks. When every wordline in a block is programmed/written, the block may be considered to be a closed block. On the other hand, an open block may have no wordlines programmed or few wordlines programmed. A closed block may use less current during read operations than an open block. For example, the current during read operations on a closed block may be about sixty milliamps (mA) for supply current (Icc) and the current during read operations on an open block may be about one hundred and forty mA for Icc at 25 degrees Celsius (C).

The host may budget the amount of power it may supply to the storage device and the storage device may have a ceiling on the amount of power it may consume. For example, in some storage devices, the power ceiling may be 5 watts (W) or 8 W. The current consumption during reads on open blocks could violate the memory device Icc specification and such violations could result in the storage device consuming more power than budgeted from the host. As the designs of memory devices improved, a memory device could include more wordlines and as such, the difference between current during read operations on open blocks and closed blocks may also increase.

When the power consumption of the storage device exceeds one or more operating power consumptions thresholds, a controller on the storage device may execute one or more throttling algorithms to bring the power consumption under the power consumptions thresholds. If the controller is unsuccessful in reducing the power consumption below the thresholds, the controller may move the storage device to a shutdown state with no active components, wherein, normal operations may be denied to the host which may send instructions to the storage device to read data from and write data to the memory device. Therefore, when the storage device consumes more power, the performance of the storage device may be adversely affected due to throttling or, in severe conditions, shutdown of the storage device.

SUMMARY

In some implementations, the storage device may manage effects of read operations on the power consumption on the storage device. The storage device includes a memory device including blocks for storing data and a controller. The controller may determine openness of blocks on the memory device and execute at a first protocol to fill open blocks on the memory device such that subsequent read operations are performed on blocks that have been filled and/or a second protocol to control which read operations are sent to the memory device based on real-time power consumption on the storage device.

In some implementations, a method is provided on a storage device for managing effects of read operations on power consumption on the storage device. The method includes determining openness of blocks on a memory device. The method also includes executing a first protocol to fill open blocks on the memory device such that subsequent read operations are performed on blocks that have been filled and/or a second protocol to control which read operations are sent to the memory device based on real-time power consumption on the storage device.

In some implementations, a method is provided on a storage device for managing effects of read operations on power consumption on the storage device. The method includes determining openness of blocks on a memory device. The method also includes using levels of openness of the blocks on the memory device to group open blocks into categories and filling a first category of open blocks such that subsequent read operations are performed on blocks that have been filled. In addition to or as an alternative to using levels of openness, the method also includes generating power tokens based on real-time power consumption of the storage device, wherein each power token is associated with a profile that is generated based on the openness of a block and using the power tokens to control which read operations are sent to the memory device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

Figure 1:
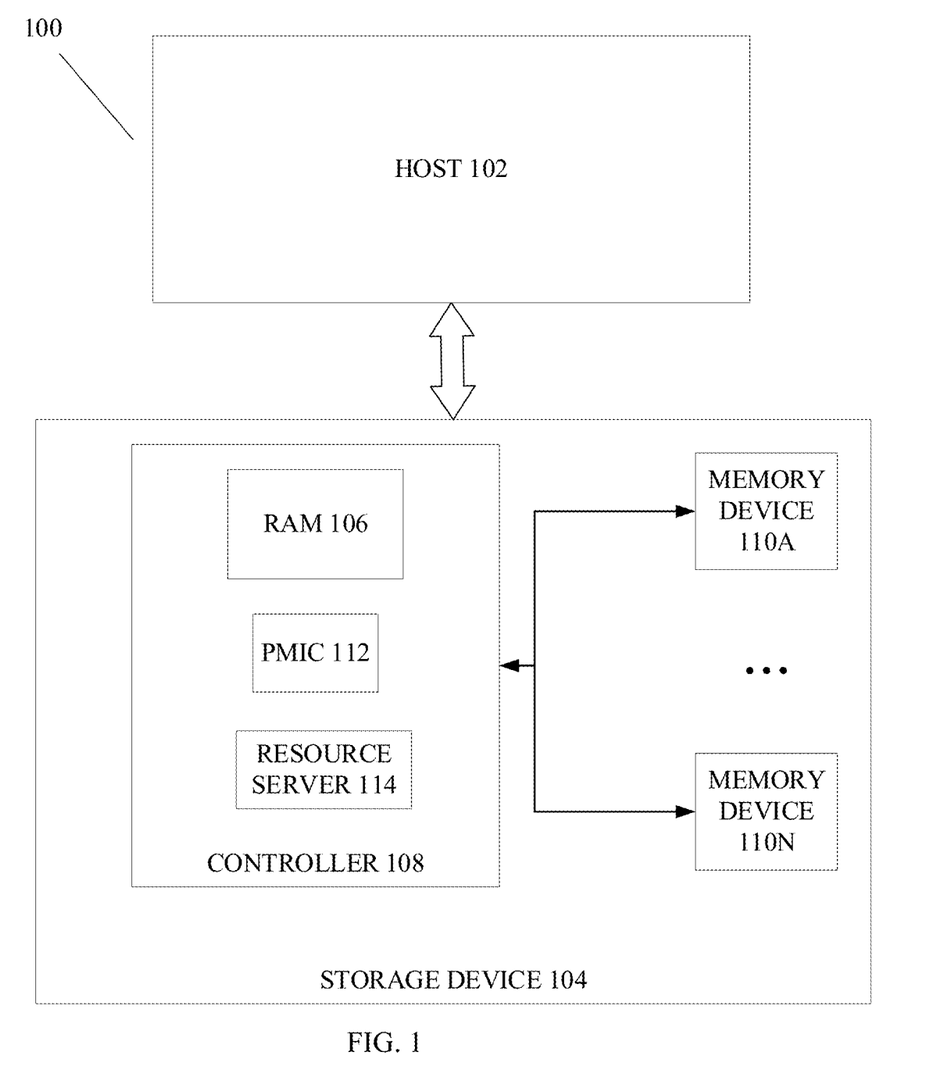
FIG. 1 is a schematic block diagram of an example system in accordance with some implementations.

FIG. 1 is a schematic block diagram of an example system in accordance with some implementations. System 100 includes a host 102 and a storage device 104. Host 102 and storage device 104 may be in the same physical location as components on a single computing device or on different computing devices that are communicatively coupled. Storage device 104, in various embodiments, may be disposed in one or more different locations relative to the host 102. System 100 may include additional components (not shown in this figure for the sake of simplicity).

Storage device 104 may include a random-access memory (RAM) 106, a controller 108, one or more non-volatile memory devices 110a-110n (referred to herein as the memory device(s) 110), a power management unit (PMIC) 112 and a resource server 114. Storage device 104 may be, for example, a solid-state drive (SSD), and the like. RAM 106 may be temporary storage such as a dynamic RAM (DRAM) that may be used to cache information in storage device 104. PMIC 112 may monitor the power consumption on storage device 104 and resource server 114 may control which operations are sent to memory device 110.

Memory device 110 may be flash based. For example, memory device 110 may be a NAND flash memory that may be used for storing host and control data over the operational life of memory device 110. Memory device 110 may be included in storage device 104 or may be otherwise communicatively coupled to storage device 104. Memory device 110 may be divided into blocks and data may be stored in the blocks in various formats, with the formats being defined by the number of bits that may be stored per memory cell. For example, a single-layer cell (SLC) format may write one bit of information per memory cell, a multi-layer cell (MLC) format may write two bits of information per memory cell, a triple-layer cell (TLC) format may write three bits of information per memory cell, and a quadruple-layer cell (QLC) format may write four bits of information per memory cell, and so on. Formats storing fewer bits in each cell are more easily accessed, durable, and less error-prone than formats storing more bits per cell. However, formats storing fewer bits in each cell are also more expensive.

Controller 108 may interface with host 102 and process foreground operations including instructions transmitted from host 102. For example, controller 108 may read data from and/or write to memory device 110 based on instructions received from host 102. Controller 108 may further execute background operations to manage resources on memory device 110. For example, controller 108 may monitor memory device 110 and may execute garbage collection and other relocation functions per internal relocation algorithms to refresh and/or relocate the data on memory device 110.

Controller 108 may read data from blocks in memory device 110 based on instructions received from host 102. As such the number of reads on open and closed blocks in memory device 110 may be host workload dependent and may not be controlled by storage device 104. To avoid excessive block reads on open blocks and keep storage device 104 from drawing too much power from host 102, PMIC 112 may monitor the power consumption on storage device 104. When the power consumption on storage device 104 crosses a power consumption threshold, PMIC 112 may generate a warning to indicate to controller 108 that the power consumption on storage device 104 is reaching the maximum allowed. For example, PMIC 112 may generate a warning to indicate to controller 108 that the power consumption on storage device 104 is reaching the maximum power budgeted for storage device 104 by host 102.

To reduce the power consumption of reads on memory device, controller 108 may determine the openness of blocks on memory device and may execute a first protocol to fill open blocks and/or and a second protocol to control which read operations are sent to memory device. When controller 108 executes the first protocol, read operations from host 102 may use less power as controller 108 may read from blocks have been filled after executing of the first protocol. When in controller 108 executes the second protocol, controller 108 may use the real-time power consumption of storage device 104 to manage how read operations are sent to memory device.

The first protocol may be an open block fill protocol wherein controller 108 may use flash translation layer information to determine the openness of the blocks and may group the open blocks. For example, controller 108 may use a power threshold to group blocks, wherein blocks with openness above the power threshold may be grouped in a first category and blocks with openness below the power threshold may be grouped in a second category. For example, blocks that are more than 50% open may be grouped in the first category and blocks that are less than 50% open may be grouped in the second category. In some cases, controller 108 may dummy-fill the blocks (i.e., store dummy data in the blocks) in the first category to significantly reduce the power used for subsequent open block reads. For instance, controller 108 may dummy-fill the blocks in the first category when foreground performance is given a high priority. In some cases, controller 108 may use garbage collection to fill the blocks with host data. The garbage collection may also free up space on memory device 110 while reducing the power for read operations.

It should be noted that controller 108 may group the blocks into more than two categories and may fill blocks in the various categories in different amounts. For example, if controller 108 groups the blocks in three categories, with the first category having the most opened set of blocks, the second category having the second most opened set of blocks, and the third category having the least opened set of blocks, controller may dummy-fill or use garbage collection to fill the blocks in the first category more than the blocks in the second and/or third categories. Controller 108 may execute the open block fill protocol based on information received from PMIC 112.

The second protocol may be a token allocation protocol that may be executed in addition to or as an alternative to the open block fill protocol. In the token allocation protocol, controller 108 may generate a set of power tokens and allocate power tokens from the set to a number of token pools. For example, controller 108 may create and maintain a pool of power tokens that are relevant to the average power and a pool of power tokens that would be representative of peak consumption. The average power may be the maximum power that is expected to be consumed over a given time period, for example, one second. The peak maximum endeavors to ensure that power consumption on storage device 104 may remain under a higher limit for durations of, for example, 100 milliseconds. The higher limit may be on the order of, for example, 7.5 W-8.25 W. Controller 108 may calculate the power tokens for each pool in real time based on the power consumption of storage device 104. Each power token may be assigned a power consumption amount or token value such that token value for open block reads may be higher than those used for closed block reads. In generating and/or allocating tokens to operations, controller 108 may compensate for other parameters including, for example, temperature, non-erase bit count, shallow erase, and the like.

To ensure that the allocated power tokens do not consume more power than is allowed for according to the power ceiling of storage device 104, controller 108 may allocate the power tokens per operation based on a budget associated with a token pool. For read operations, power tokens may be divided amongst the sense and transfer aspects of the operation. If, for example, the average power limit is 5 W and the peak power limit is 8 W, rather than generating one sense token for a memory format type and average power (for example, one SLC sense token for average power) and one sense token for the memory format type and peak power (for example, one SLC sense token for peak power) and assigning those tokens to all read operations on SLC blocks, controller 108 may generate separate profiles and token allotments for different sense scenarios based on the block openness. So rather than generating one SLC sense token for average power, one SLC sense token for peak power, one TLC sense token for average power, one TLC sense token for peak power, and so on, controller 108 may generate a pool of sense token profiles for the memory formats, power type (for example, average/peak), and percentage of block openness.

Controller may generate sense profile token allocation via the following:

$$\text{Operation Current (mA)} * \frac{\text{Component } VCC}{\text{Efficency}} = \text{Tokens}$$

Controller 108 may allot tokens to different sense scenarios based on the openness of a block and may create transfer tokens that may remain constant. For instance, controller 108 may create a profile including sense tokens for an SLC block with an average power and zero percent openness, twenty-five percent openness, fifty percent openness, seventy-five percent openness, one hundred percent openness. Controller 108 may also create sense tokens for the SLC block with the peak power and zero percent openness, twenty-five percent openness, fifty percent openness, seventy-five percent openness, one hundred percent openness. Controller 108 may also create sense tokens for read operations for a TLC block with an average power and zero percent openness, twenty-five percent openness, fifty percent openness, seventy-five percent openness, one hundred percent openness; and sense tokens for the TLC block with the peak power and zero percent openness, twenty-five percent openness, fifty percent openness, seventy-five percent openness, one hundred percent openness. Controller 108 may create the same set of sense tokens for other formats such as MLC and QLC blocks.

Controller 108 may assign a sense token per operation, wherein when a sense token is assigned to an operation, the power consumption of outstanding assigned sense tokens may not exceed the power ceiling of the pool. For example, when storage device 104 receives a read instruction from host 102, controller 108 may determine the format of the block where the read is to occur and the openness of the block. Controller 108 may then select the sense token associated with that format and openness from a pool and deduct the power or token value assigned to that sense token from a total allowable power or token value for the pool. Controller 108 may send the sense token allocated to the operation to resource server 114, wherein resource server 114 may control which operations are sent to memory device 110.

When storage device 104 receives a second instruction from host 102, controller 108 may determine the power consumption of outstanding tokens and may use that determination when allocating a sense token for the second instruction. Consider an example where controller 108 determines that the second instruction is to perform a read on an open block. If controller 108 determines that allocating a sense token to the second instruction will cause storage device 104 to exceed its power ceiling for a pool, controller 108 may reserve assigning the sense token for the second instruction until such time when the allocation will not cause storage device 104 to exceed its power ceiling for the pool. As such, if based on the pool budget, sense tokens are not available, resource server 114 may differ the second read until sense tokens for that pool are released or become available. As noted, a memory device 110 may have multiple dies and controller 108 may use the token allocations to control/manage how operations are sent to memory device 110.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
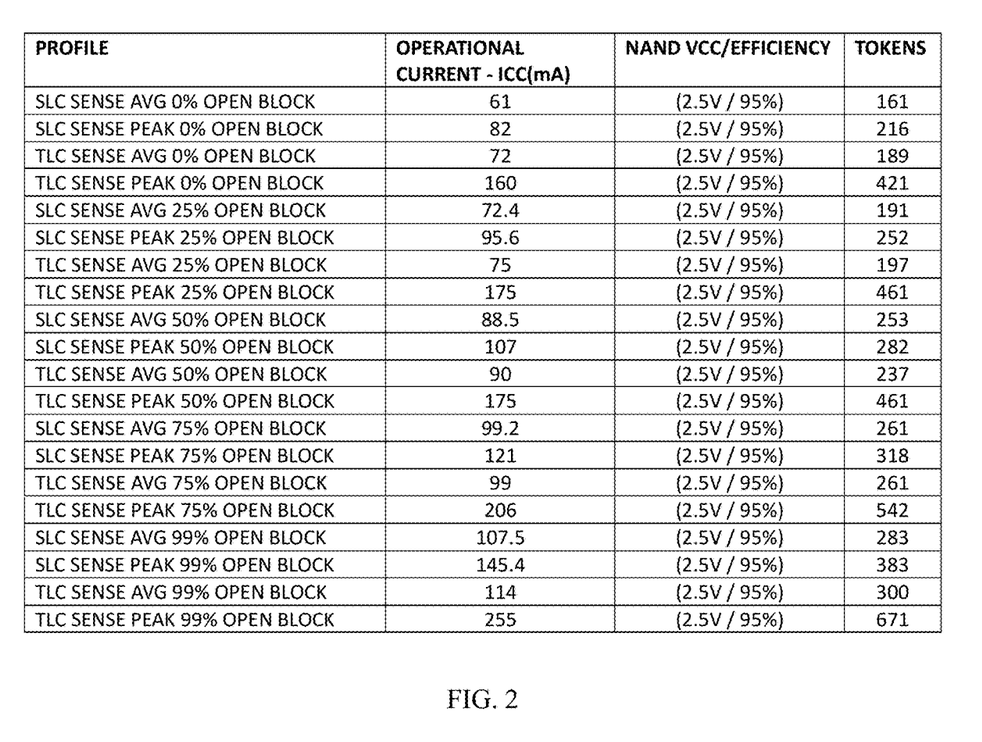
FIG. 2 is an example of a table including profiles having tokens for different sense scenarios based on the openness of a block in accordance with some implementations.

FIG. 2 is an example of a table including profiles having tokens for different sense scenarios based on the openness of a block in accordance with some implementations. Table 200 includes tokens for different SLC and TLC sense scenarios wherein each token is generated for a sense profile by multiplying the operation current (mA) by the dividend of the NAND voltage and efficiency. Table 200 includes sense tokens for different SLC and TLC sense scenarios with average and peak power at zero percent openness, twenty-five percent openness, fifty percent openness, seventy-five percent openness, ninety-nine percent openness.

Sense tokens assigned to profiles associated with closed blocks may have a lower token value and may be given a higher priority for read operations when power consumption on storage device 104 is nearing the power ceiling or approaching a threshold. For example, the sense tokens associated with zero percent openness may use less power and have a lower impact on an overall token budget. So, these tokens may be given a higher priority than sense tokens associated with ninety-nine percent openness. Sense token assignments may therefore be used by controller 108 to manage the effect of read operations on the power consumption of storage device 104. FIG. 2 is provided as an example. Other examples may differ from what is described in FIG. 2.

Figure 3:
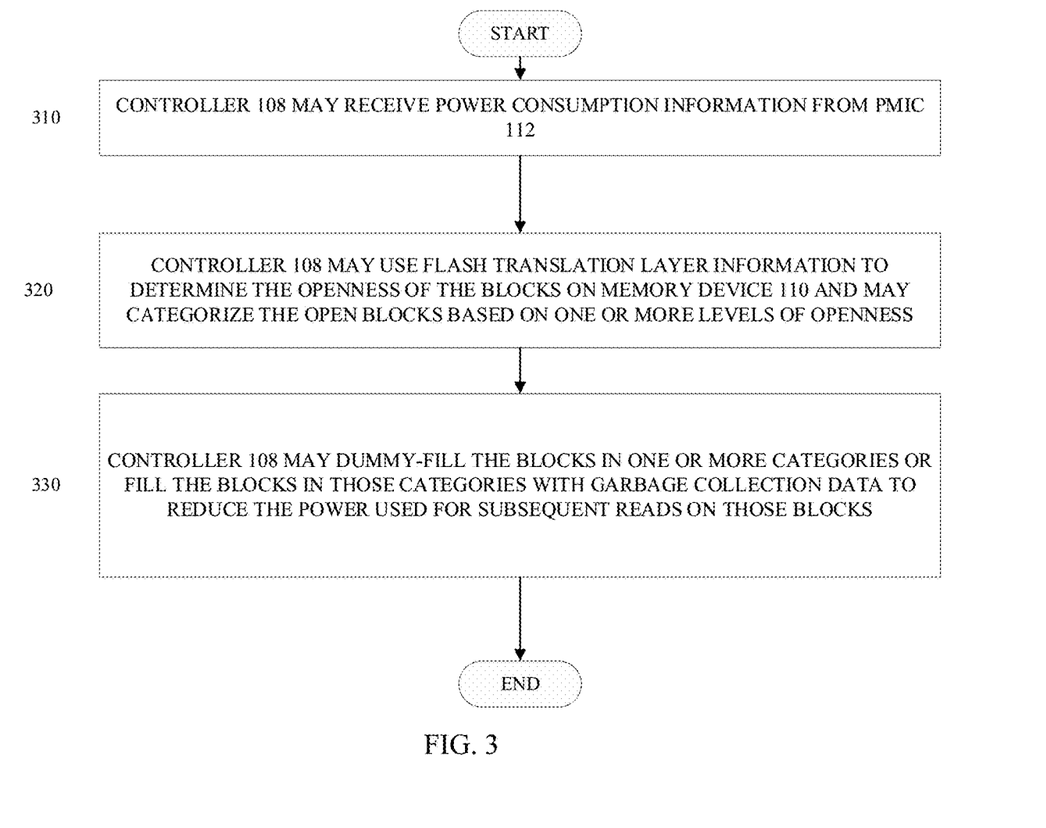
FIG. 3 is a flow diagram of an open block fill protocol used to reduce the power of open block reads in accordance with some implementations.

FIG. 3 is a flow diagram of an open block fill protocol used to reduce the power of open block reads in accordance with some implementations. At 310, controller 108 may receive power consumption information from PMIC 112. At 320, controller 108 may use flash translation layer information to determine the openness of the blocks on memory device 110 and may categorize the open blocks based on one or more levels of openness. At 330, controller 108 may dummy-fill the blocks in one or more categories or fill the blocks in those categories with garbage collection data to reduce the power used for subsequent reads on those blocks. FIG. 3 is provided as an example. Other examples may differ from what is described in FIG. 3.

Figure 4:
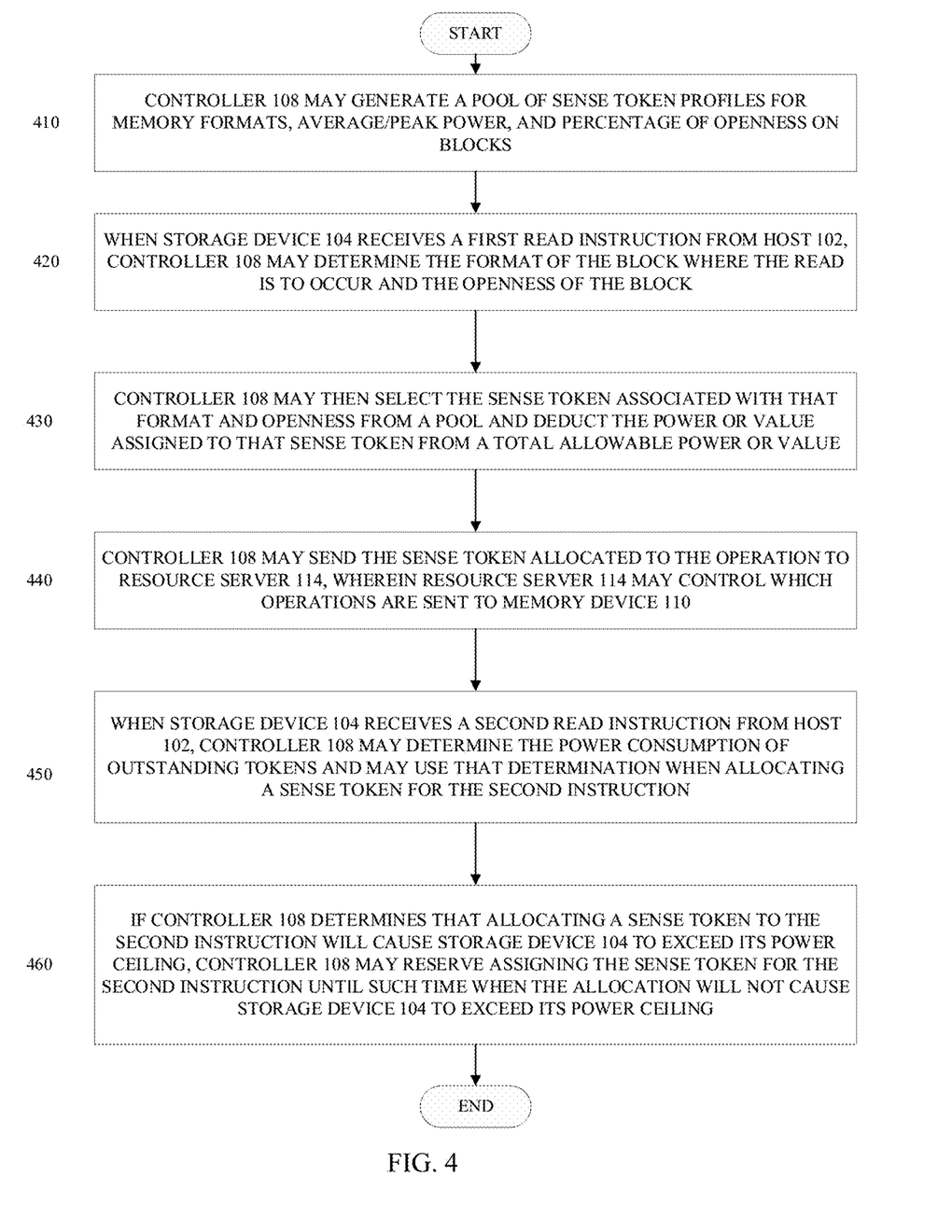
FIG. 4 is a flow diagram of a token allocation protocol used to reduce the power of open block reads in accordance with some implementations.

FIG. 4 is a flow diagram of a token allocation protocol used to reduce the power of open block reads in accordance with some implementations. At 410, controller 108 may generate a pool of sense token profiles for memory formats, average/peak power, and percentage of openness on blocks. At 420, when storage device 104 receives a first read instruction from host 102, controller 108 may determine the format of the block where the read is to occur and the openness of the block. At 430, controller 108 may then select the sense token associated with that format and openness from a pool and deduct the power or value assigned to that sense token from a total allowable power or value. At 440, controller 108 may send the sense token allocated to the operation to resource server 114, wherein resource server 114 may control which operations are sent to memory device 110. At 450, when storage device 104 receives a second read instruction from host 102, controller 108 may determine the power consumption of outstanding tokens and may use that determination when allocating a sense token for the second instruction. At 460, if controller 108 determines that allocating a sense token to the second instruction will cause storage device 104 to exceed its power ceiling, controller 108 may reserve assigning the sense token for the second instruction until such time when the allocation will not cause storage device 104 to exceed its power ceiling. As indicated above FIG. 4 is provided as an example. Other examples may differ from what is described in FIG. 4.

Figure 5:
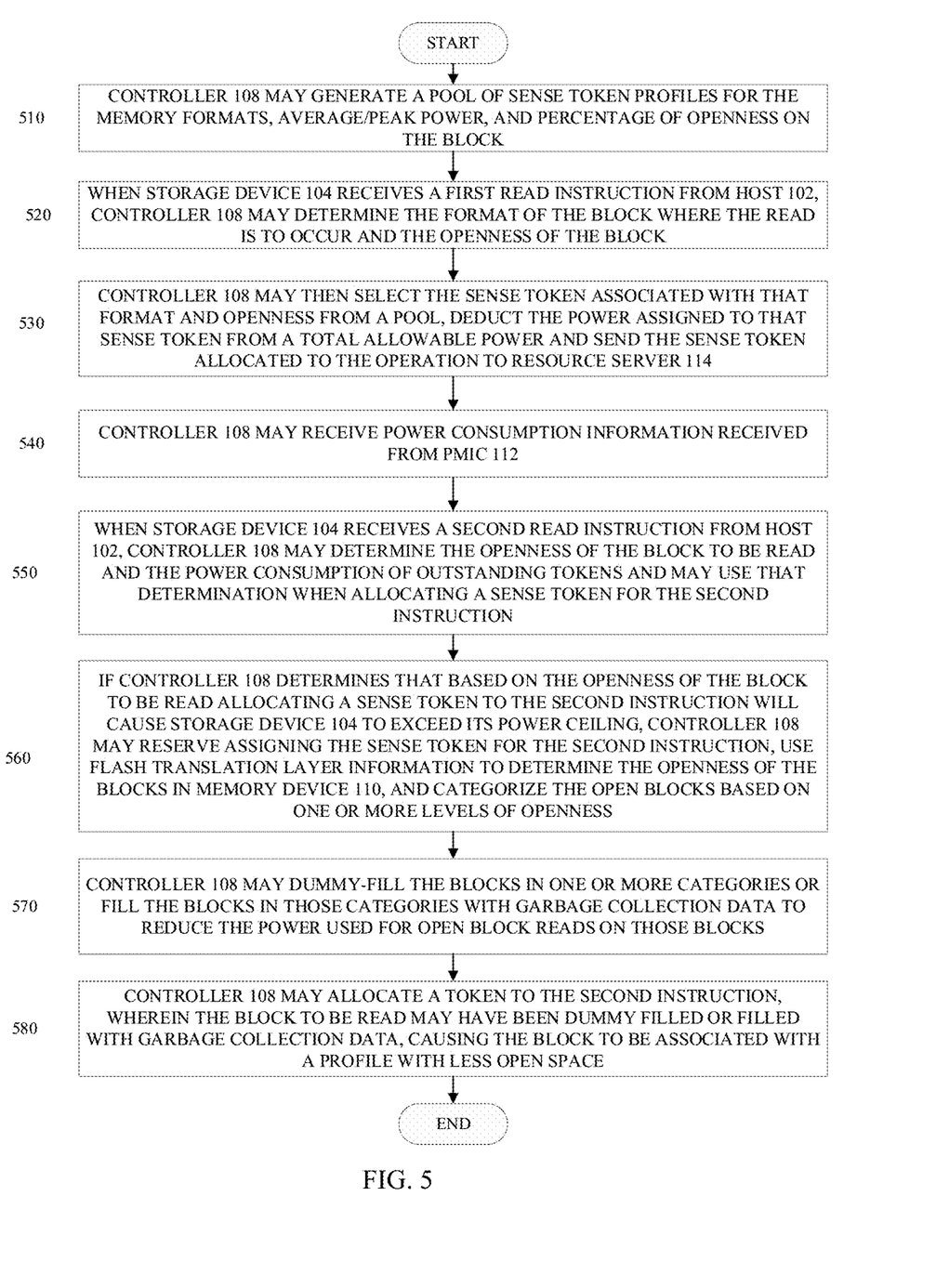
FIG. 5 is a flow diagram of how the open block fill protocol and the token allocation protocol are used to reduce the power of open block reads in accordance with some implementations.

FIG. 5 is a flow diagram of how the open block fill protocol and the token allocation protocol are used to reduce the power of open block reads in accordance with some implementations. At 510, controller 108 may generate a pool of sense token profiles for memory formats, average/peak power, and percentage of openness on blocks. At 520, when storage device 104 receives a first read instruction from host 102, controller 108 may determine the format of the block where the read is to occur and the openness of the block. At 530, controller 108 may then select the sense token associated with that format and openness from a pool, deduct the power/value assigned to that sense token from a total allowable power/value and send the sense token allocated to the operation to resource server 114.

At 540, controller 108 may receive power consumption information from PMIC 112. At 550, when storage device 104 receives a second read instruction from host 102, controller 108 may determine the openness of the block to be read and the power consumption of outstanding tokens and may use that determination when allocating a sense token for the second instruction. At 560, if controller 108 determines that based on the openness of the block to be read allocating a sense token to the second instruction will cause storage device 104 to exceed its power ceiling, controller 108 may reserve assigning the sense token for the second instruction, use flash translation layer information to determine the openness of the blocks in memory device 110, and categorize the open blocks based on one or more levels of openness. At 570, controller 108 may dummy-fill the blocks in one or more categories or fill the blocks in those categories with garbage collection data to reduce the power used for open block reads on those blocks. At 580, controller 108 may allocate a token to the second instruction, wherein the block to be read may have been dummy filled or filled with garbage collection data, causing the block to be associated with a profile with less open space. As indicated above FIG. 5 is provided as an example. Other examples may differ from what is described in FIG. 5.

Figure 6:
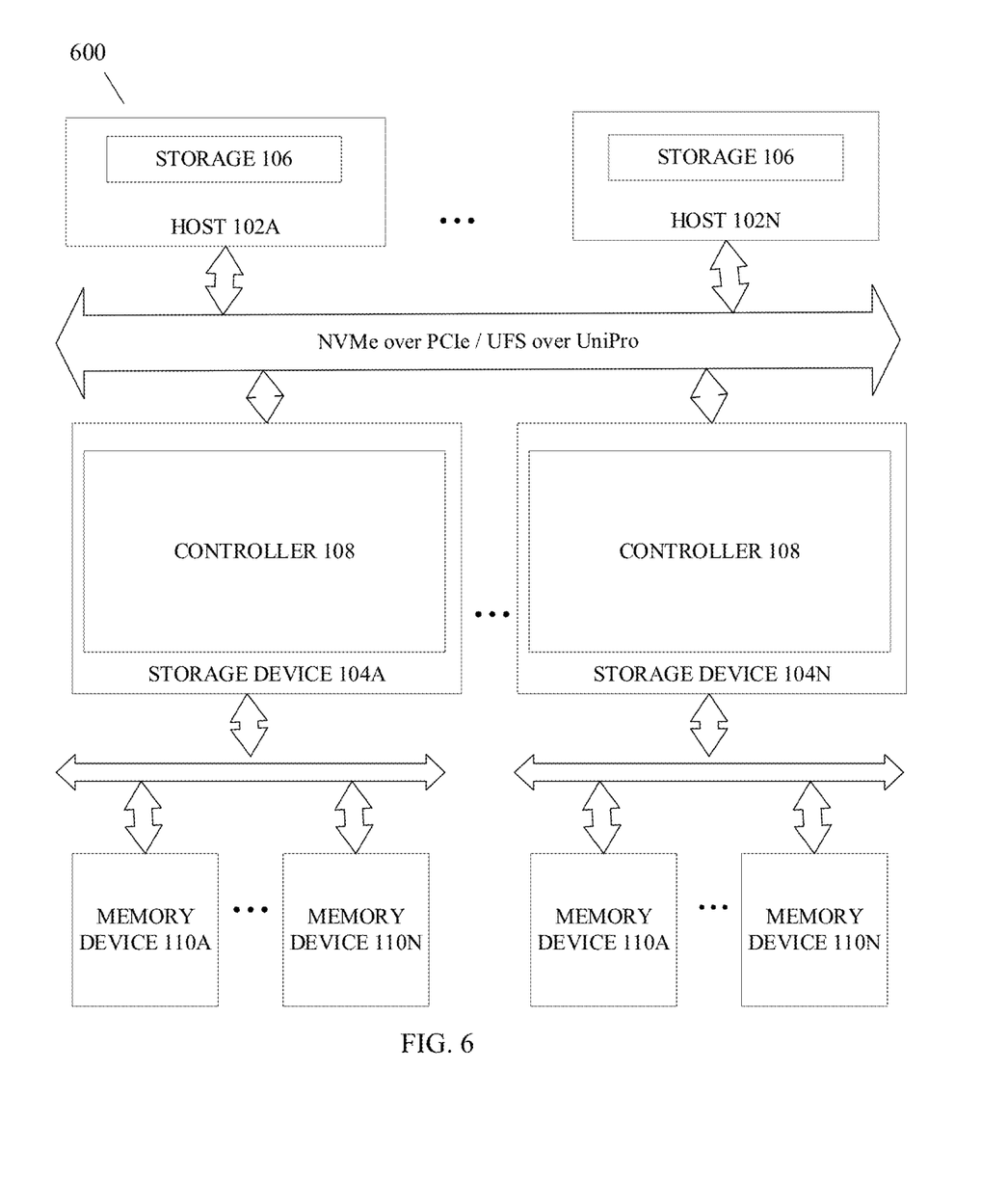
FIG. 6 is a diagram of an example environment in which systems and/or methods described herein are implemented.

FIG. 6 is a diagram of an example environment in which systems and/or methods described herein are implemented. As shown in FIG. 6, Environment 600 may include hosts 102-102n (referred to herein as host(s) 102), and storage devices 104a-104n (referred to herein as storage device(s) 104).

Storage device 104 may include a controller 108 to manage the resources on storage device 104. Controller 108 may manage the effects of read operations on power consumption on storage device 104 by executing one or more protocols to fill blocks on memory device and/or to manage how power is consumed during read operations. Hosts 102 and storage devices 104 may communicate via Non-Volatile Memory Express (NVMe) over peripheral component interconnect express (PCI Express or PCIe) standard, the Universal Flash Storage (UFS) over Unipro, or the like.

Devices of Environment 600 may interconnect via wired connections, wireless connections, or a combination of wired and wireless connections. For example, the network of FIG. 6 may include a cellular network (e.g., a long-term evolution (LTE) network, a code division multiple access (CDMA) network, a 3G network, a 4G network, a 5G network, another type of next-generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of Environment 600 may perform one or more functions described as being performed by another set of devices of Environment 600.

Figure 7:
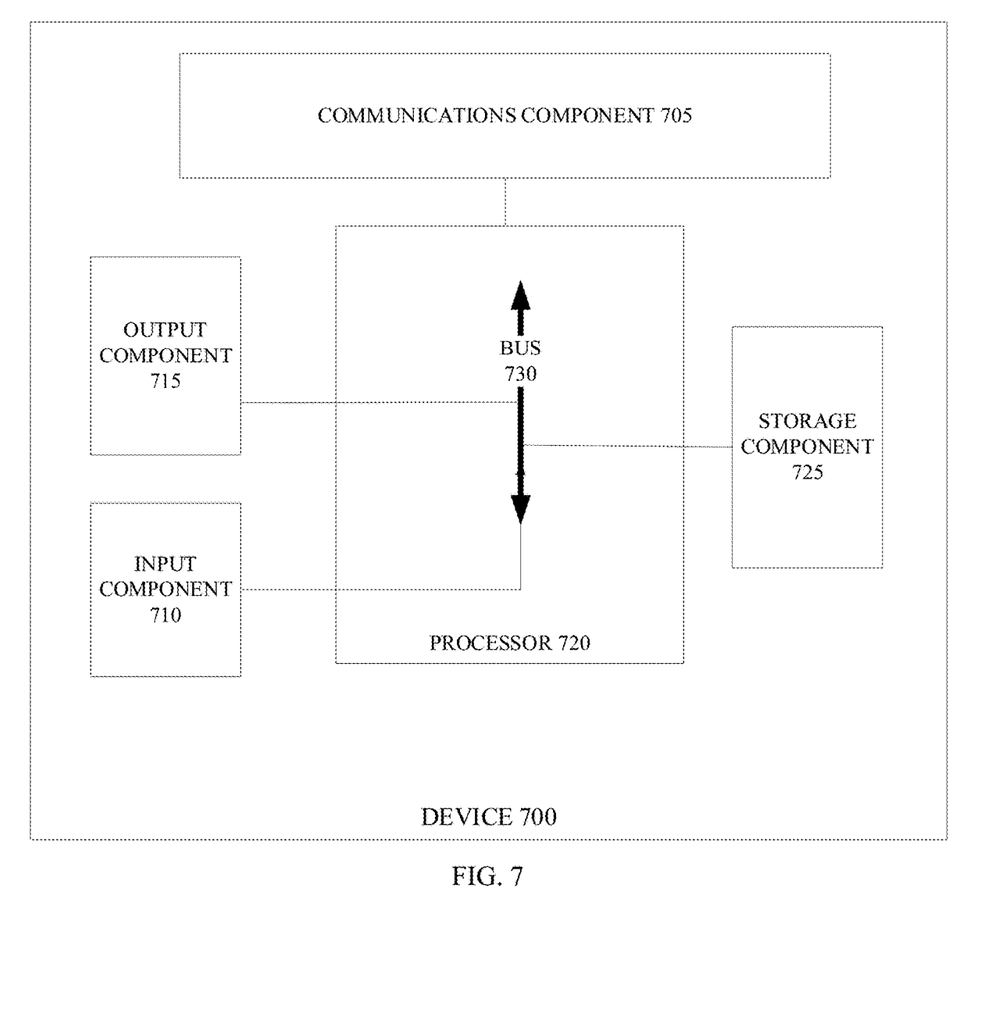
FIG. 7 is a diagram of example components of the host of FIG. 1.

FIG. 7 is a diagram of example components of one or more devices of FIG. 1. In some implementations, host 102 may include one or more devices 700 and/or one or more components of device 700. Device 700 may include, for example, a communications component 705, an input component 710, an output component 715, a processor 720, a storage component 725, and a bus 730. Bus 730 may include components that enable communication among multiple components of device 700, wherein components of device 700 may be coupled to be in communication with other components of device 700 via bus 730.

Input component 710 may include components that permit device 700 to receive information via user input (e.g., keypad, a keyboard, a mouse, a pointing device, a microphone, and/or a display screen), and/or components that permit device 700 to determine the location or other sensor information (e.g., an accelerometer, a gyroscope, an actuator, another type of positional or environmental sensor). Output component 715 may include components that provide output information from device 700 (e.g., a speaker, display screen, and/or the like). Input component 710 and output component 715 may also be coupled to be in communication with processor 720.

Processor 720 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 720 may include one or more processors capable of being programmed to perform a function. Processor 720 may be implemented in hardware, firmware, and/or a combination of hardware and software.

Storage component 725 may include one or more memory devices, such as random-access memory (RAM) 106, read-only memory (ROM), and/or another type of dynamic or static storage device (e.g., a flash memory, a magnetic memory, and/or optical memory) that stores information and/or instructions for use by processor 720. A memory device may include memory space within a single physical storage device or memory space spread across multiple physical storage devices. Storage component 725 may also store information and/or software related to the operation and use of device 700. For example, storage component 725 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 705 may include a transceiver-like component that enables device 700 to communicate with other devices, such as via a wired connection, a wireless connection, or a combination of wired and wireless connections. The communications component 705 may permit device 700 to receive information from another device and/or provide information to another device. For example, communications component 705 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 705 may also include one or more broadband and/or narrowband transceivers and/or other similar types of wireless transceiver configurable to communicate via a wireless network for infrastructure communications. Communications component 705 may also include one or more local area network or personal area network transceivers, such as a Wi-Fi transceiver or a Bluetooth transceiver.

Device 700 may perform one or more processes described herein. For example, device 700 may perform these processes based on processor 720 executing software instructions stored by a non-transitory computer-readable medium, such as storage component 725. As used herein, the term "computer-readable medium" refers to a non-transitory memory device. Software instructions may be read into storage component 725 from another computer-readable medium or from another device via communications component 705. When executed, software instructions stored in storage component 725 may cause processor 720 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more" The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to manage effects of read operations on power consumption on the storage device comprising:
a memory device including blocks to store data; and
a controller configured to:
determine openness of blocks on the memory device; and
execute a first protocol to fill open blocks on the memory device such that subsequent read operations are performed on blocks that have been filled and a second protocol to control which read operations are sent to the memory device based on real-time power consumption on the storage device,
wherein the second protocol includes generating power tokens based on the real-time power consumption of the storage device, and each power token is associated with a profile that is generated based on the openness of a respective block.

2. The storage device of claim 1, wherein the first protocol includes using levels of openness of the blocks on the memory device to group open blocks into categories and filling a first category of open blocks.

3. The storage device of claim 2, wherein the controller is further configured to store at least one of dummy data and garbage collection data in the first category of open blocks.

4. The storage device of claim 3, wherein the controller is further configured to stores dummy data in the first category of open blocks when foreground performance is given a high priority.

5. The storage device of claim 1, wherein the controller is further configured to generate the power tokens by multiplying an operation current by a dividend of a component voltage divided by efficiency.

6. The storage device of claim 1, wherein the power tokens are divided among sense and transfer aspects of read operations, and the controller is further configured to generate sense tokens based on a memory format, power type, and a percentage of block openness.

7. The storage device of claim 6, wherein the controller is further configured to assign sense tokens to different sense scenarios based on the block openness and creates transfer tokens that remain constant.

8. The storage device of claim 6, wherein the controller is further configured to assign a sense token per operation, such that when each respective sense token is assigned to an operation, power consumption of outstanding assigned sense tokens remains below a power ceiling of the storage device.

9. The storage device of claim 1, further comprising a power management unit configured to monitor power consumption on the storage device and send an indication to the controller when the power consumption on the storage device exceeds a threshold.

10. A method performed on a storage device to manage effects of read operations on power consumption on the storage device, wherein the storage device comprises a controller to execute the method, the method comprising:
determining openness of blocks on a memory device; and
executing a first protocol to fill open blocks on the memory device such that subsequent read operations are performed on blocks that have been filled and a second protocol to control which read operations are sent to the memory device based on real-time power consumption on the storage device,
wherein the second protocol includes generating power tokens based on the real-time power consumption of the storage device, and each power token is associated with a profile that is generated based on the openness of a respective block.

11. The method of claim 10, wherein executing the first protocol comprises using levels of openness of the blocks on the memory device to group open blocks into categories and filling a first category of open blocks.

12. The method of claim 11, further comprising storing at least one of dummy data and garbage collection data in the first category of open blocks.

13. The method of claim 12, further comprising storing the dummy data in the first category of open blocks when foreground performance is given a high priority.

14. The method of claim 10, further comprising generating the power tokens by multiplying an operation current by a dividend of a component voltage divided by efficiency.

15. The method of claim 10, further comprising dividing the power tokens among sense and transfer aspects of read operations, and generating sense tokens based on a memory format, power type, and a percentage of block openness.

16. The method of claim 15, further comprising assigning sense tokens to different sense scenarios based on the block openness and creating transfer tokens that remain constant.

17. The method of claim 15, further comprising assigning a sense token per operation, wherein when each respective sense token is assigned to an operation, power consumption of outstanding assigned sense tokens remains below a power ceiling of the storage device.

18. A method performed on a storage device to manage effects of read operations on power consumption on the storage device, wherein the storage device comprises a controller to execute the method, the method comprising:
determining openness of blocks on a memory device;
using levels of openness of the blocks on the memory device to group open blocks into categories and filling a first category of open blocks such that subsequent read operations are performed on blocks that have been filled; and
generating power tokens based on real-time power consumption of the storage device, wherein a power token is associated with a profile that is generated based on the openness of a block and using the power tokens to control which read operations are sent to the memory device.

* * * * *